(12) United States Patent
Maruyama

(10) Patent No.: US 10,341,180 B2
(45) Date of Patent: Jul. 2, 2019

(54) DISK DISTRIBUTION SYSTEM

(71) Applicant: CO-CONV, Corp., Kyoto-shi, Kyoto (JP)

(72) Inventor: Shin Maruyama, Toyonaka (JP)

(73) Assignee: CO-CONV, CORP., Kyoto (JP)

( * ) Notice: Subject to any disclaimer, the term of this patent is extended or adjusted under 35 U.S.C. 154(b) by 11 days.

(21) Appl. No.: 14/899,477

(22) PCT Filed: Aug. 25, 2015

(86) PCT No.: PCT/JP2015/073831
§ 371 (c)(1),
(2) Date: Dec. 17, 2015

(87) PCT Pub. No.: WO2016/067725
PCT Pub. Date: May 6, 2016

(65) Prior Publication Data
US 2017/0230237 A1     Aug. 10, 2017

(30) Foreign Application Priority Data

Nov. 1, 2014   (JP) .................................. 2014-223836

(51) Int. Cl.
*G06F 8/61* (2018.01)
*G06F 8/65* (2018.01)
(Continued)

(52) U.S. Cl.
CPC .............. *H04L 41/082* (2013.01); *G06F 8/63* (2013.01); *G06F 8/65* (2013.01); *G06F 9/4416* (2013.01);
(Continued)

(58) Field of Classification Search
None
See application file for complete search history.

(56) References Cited

U.S. PATENT DOCUMENTS 6,108,697 A    8/2000  Raymond et al.
6,151,674 A   11/2000  Takatani
(Continued)

FOREIGN PATENT DOCUMENTS

| JP | 11-249900 A | 9/1999 |
| TW | 201421365 A | 6/2014 |
| WO | 2009/069326 A1 | 6/2009 |

OTHER PUBLICATIONS

Osamu Takazoe, "Kanari Naretekita!—Dokuji No VHD Boot Sabun Kanri-", Blogs—Takazoe Ha Kokoni Imasu—Site Home—TechNet Blogs_files,Microsoft Corporation [Online], Aug. 26, 2011 [Date of Search Nov. 4, 2015], Internet: <URL: http://blogs.technet.com/b/osamut/archive/2011/08/27/3449427.aspx>.

(Continued)

*Primary Examiner* — Nicholas R Taylor
*Assistant Examiner* — Tania M Pena-Santana
(74) *Attorney, Agent, or Firm* — AEON Law, PLLC; Adam L. K. Philipp; David V. H. Cohen

(57) ABSTRACT

A disk distribution system, assuming "local-boot", that is capable of efficiently executing an update or a generation management of OS image data. The disk distribution system includes at least one master server that is connected with a plurality of terminals through the network, in which OS image data including an operating system for the terminals is processed as the master data managed by the master server, and a copy of the data for a copy of the data converted into a predetermined format) is deployed as a boot image for the terminals. When the master data is updated, the terminals receive differential data reflecting the update to the master data through the network from the master server while the terminals are operating, and the boot images of the terminals are updated by rebooting the terminals.

17 Claims, 17 Drawing Sheets

(51) Int. Cl.
　　*H04L 12/24*　　　(2006.01)
　　*H04L 29/08*　　　(2006.01)
　　*G06F 9/4401*　　 (2018.01)

(52) U.S. Cl.
　　CPC ...... *H04L 41/0846* (2013.01); *H04L 67/1095* (2013.01); *H04L 67/34* (2013.01)

(56) References Cited

U.S. PATENT DOCUMENTS

| | | | | |
|---|---|---|---|---|
| 7,827,394 B2* | 11/2010 | Brown | ................ | G06F 9/44505 713/1 |
| 7,865,579 B2* | 1/2011 | Birse | .................... | G06F 9/4416 709/221 |
| 2005/0180326 A1* | 8/2005 | Goldflam | ................ | H04L 12/12 370/231 |
| 2006/0230395 A1* | 10/2006 | Paul | ......................... | G06F 8/65 717/173 |
| 2010/0162239 A1* | 6/2010 | Wires | ................. | G06F 17/30067 718/1 |
| 2011/0016414 A1* | 1/2011 | Ernst | ......................... | G06F 8/61 715/764 |
| 2012/0066466 A1* | 3/2012 | Choi | ..................... | G06F 3/0608 711/162 |
| 2012/0233448 A1 | 9/2012 | Malkhasyan et al. | | |
| 2012/0311279 A1* | 12/2012 | Hong | ................... | G06F 11/1441 711/162 |

OTHER PUBLICATIONS

Ryo Yamaichi, "Windows Tenkai Service No VHD Taioukinou Wo Tameshitemita (vol. 1)", Yamaichi Ryo No N Nantoka World, Google Inc. [Online], Sep. 27, 2010 [Date of Search Nov. 4, 2015], Internet: <URL:http://yamanxworld.blogspot.jp/2010/09/windows-vhd-1.html>.

International Search Report of PCT/JP2015/073831.

* cited by examiner

PC-A

Next time
Boot using this image minisetup0a.vhd (Differential data relative to 0. vhd)

0.vhd (Master Data in OOBE state)

<Step S1>

PC-A writecache0a.vhd

Boot using this image minisetup0a.vhd 0.vhd

<Step S2>

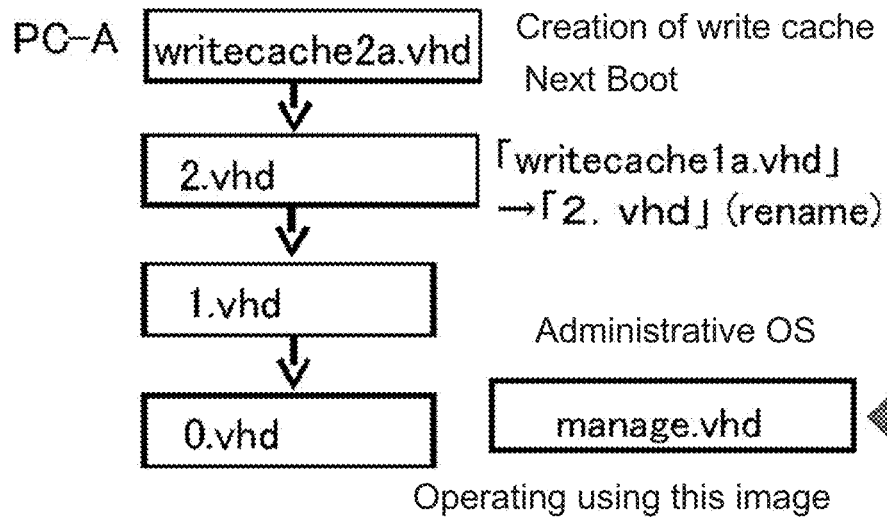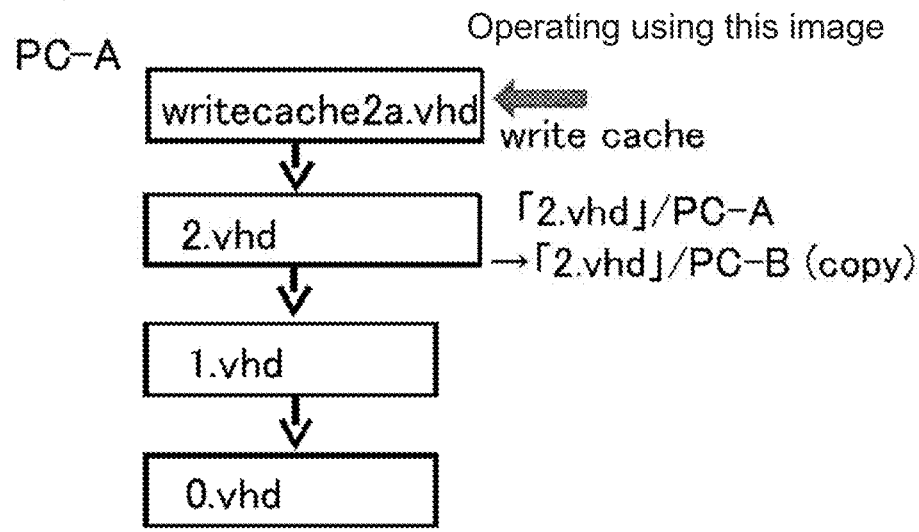

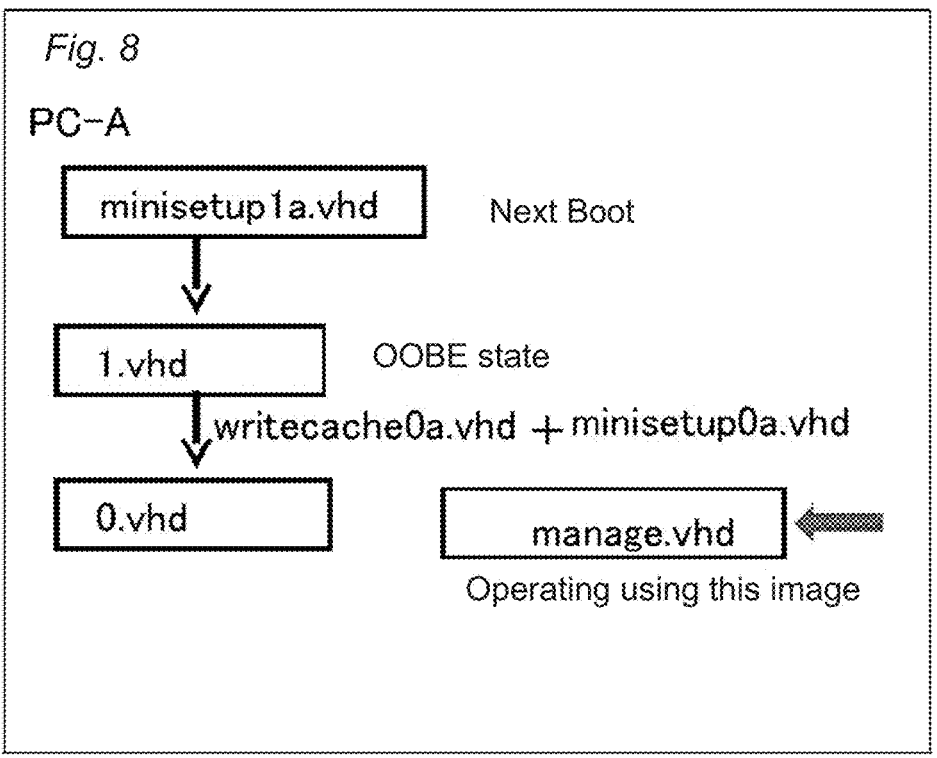

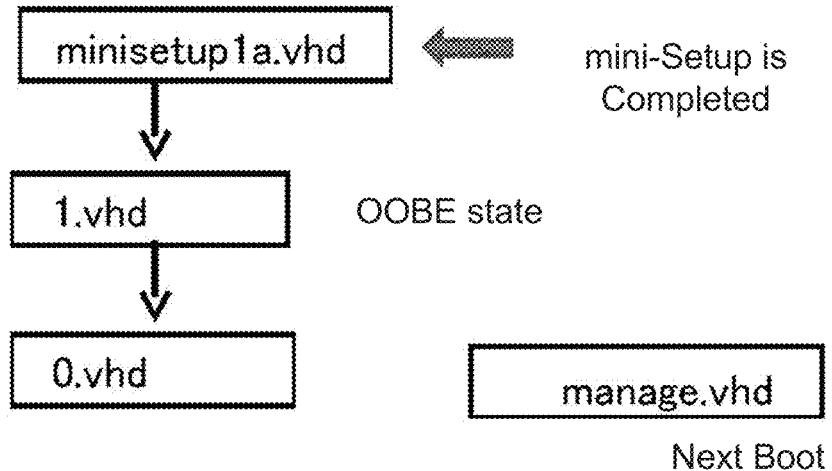
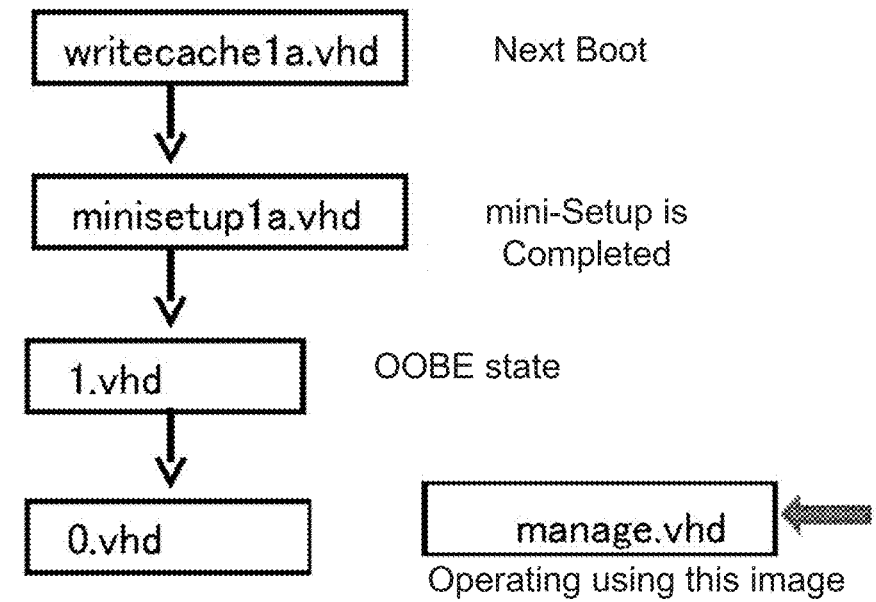

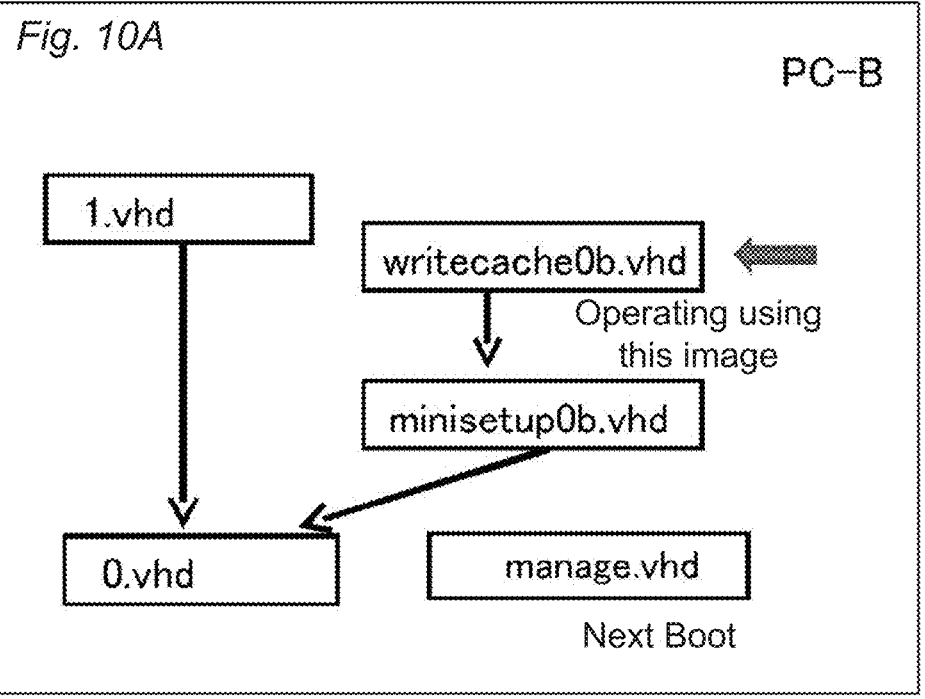
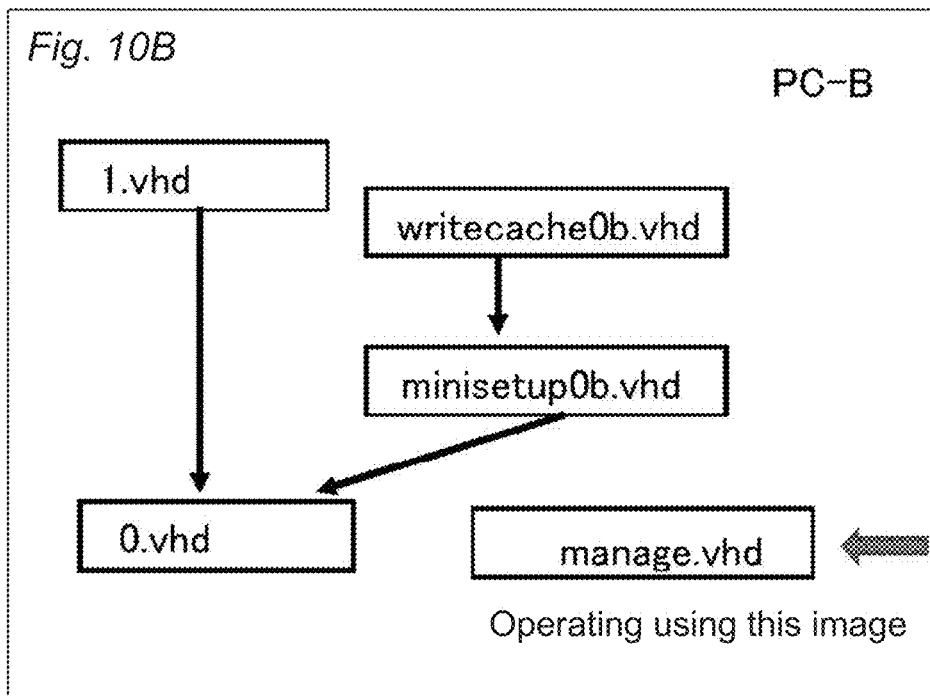

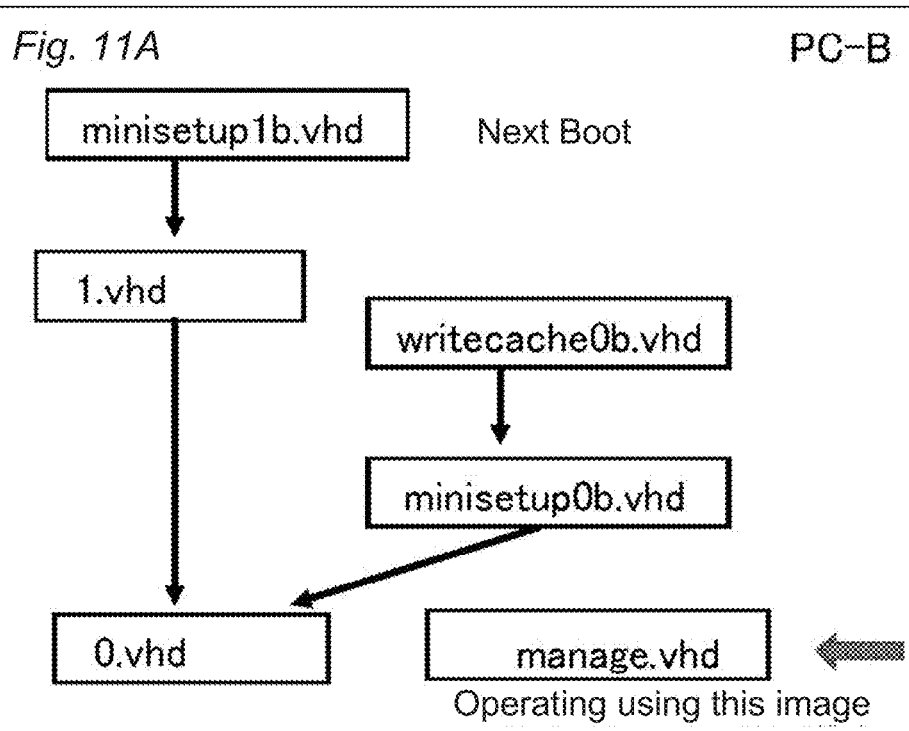
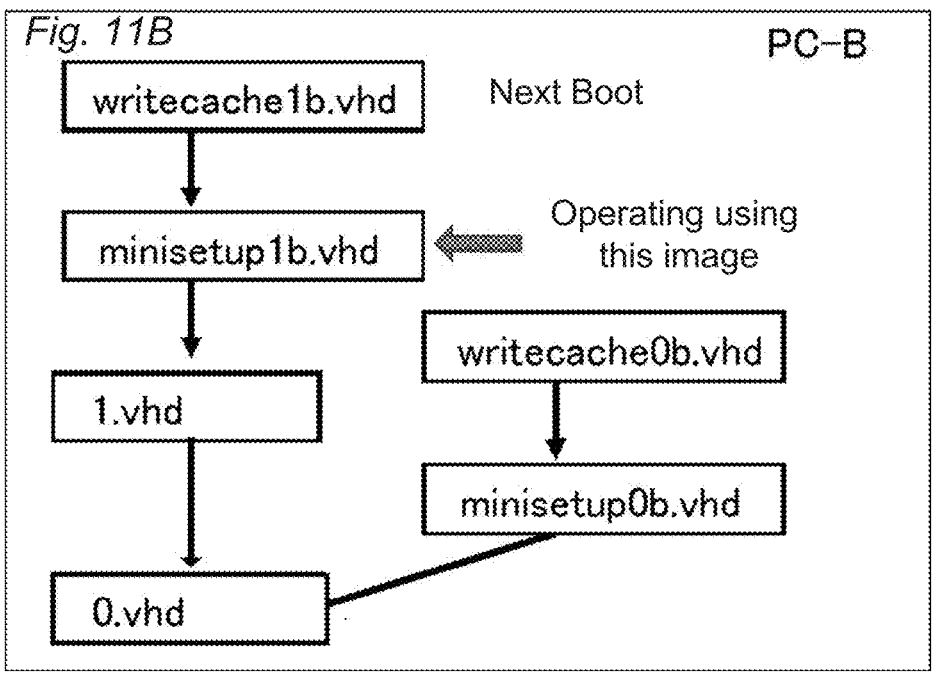

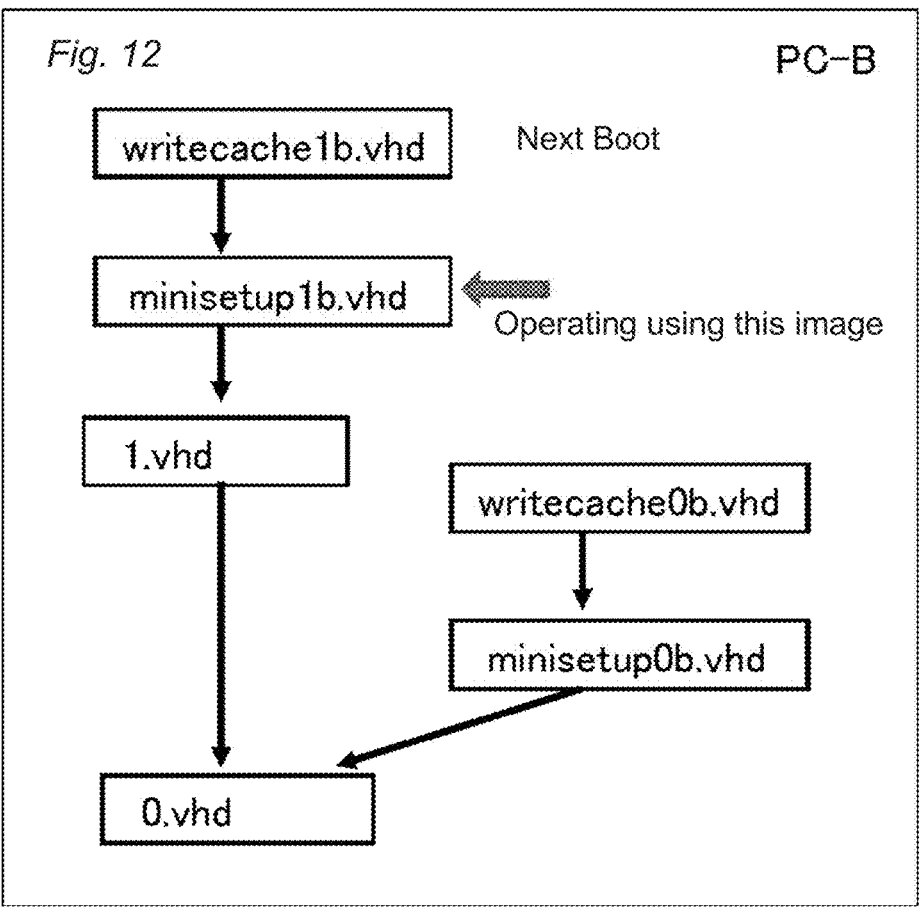

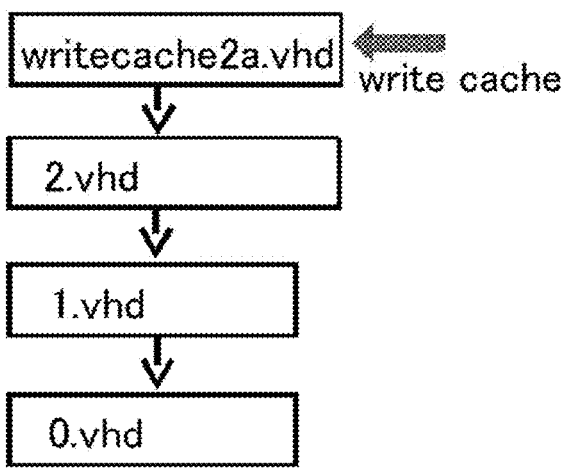
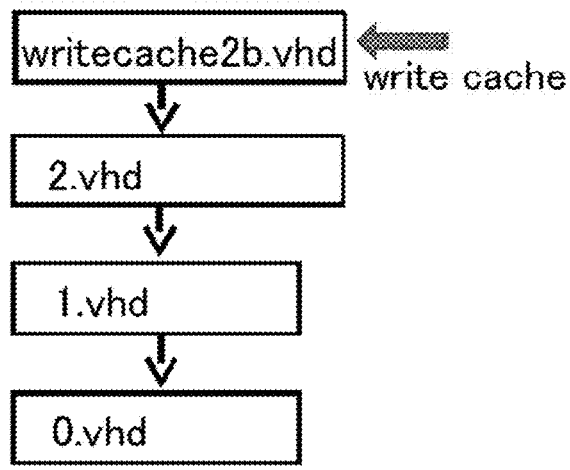

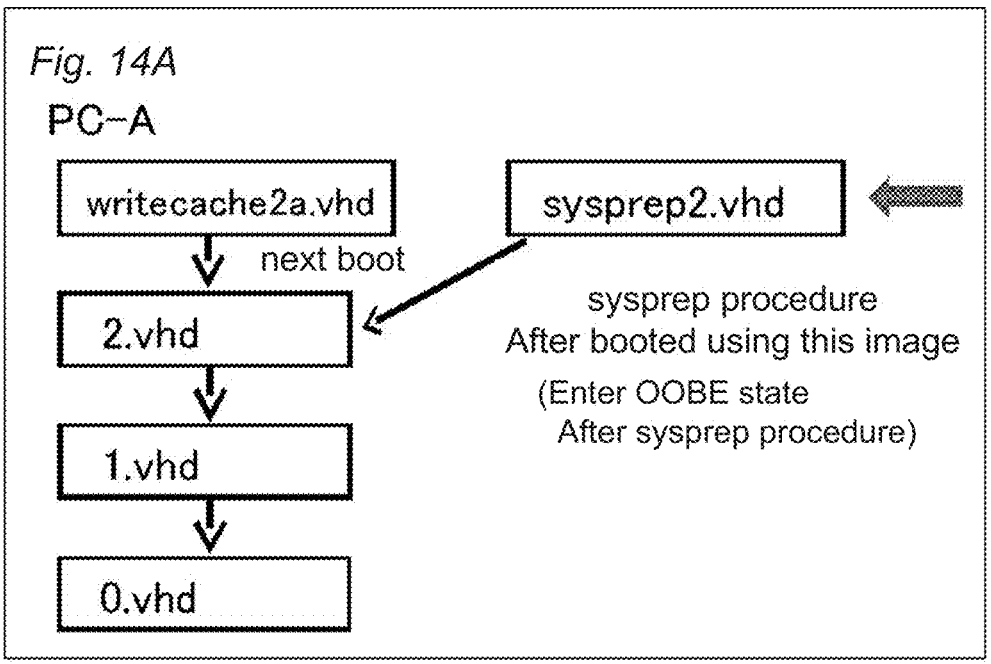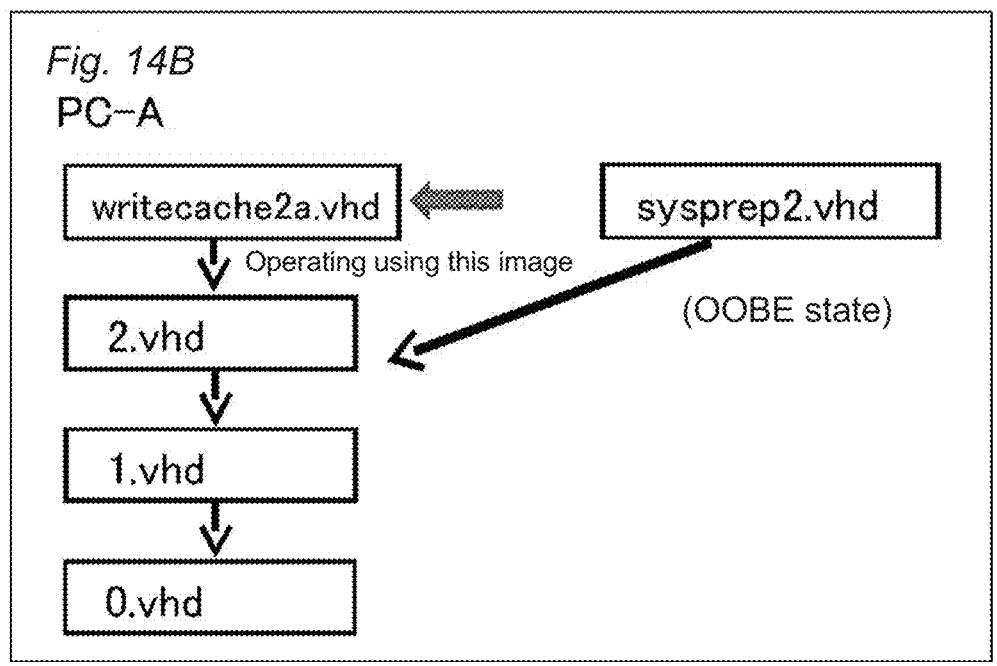

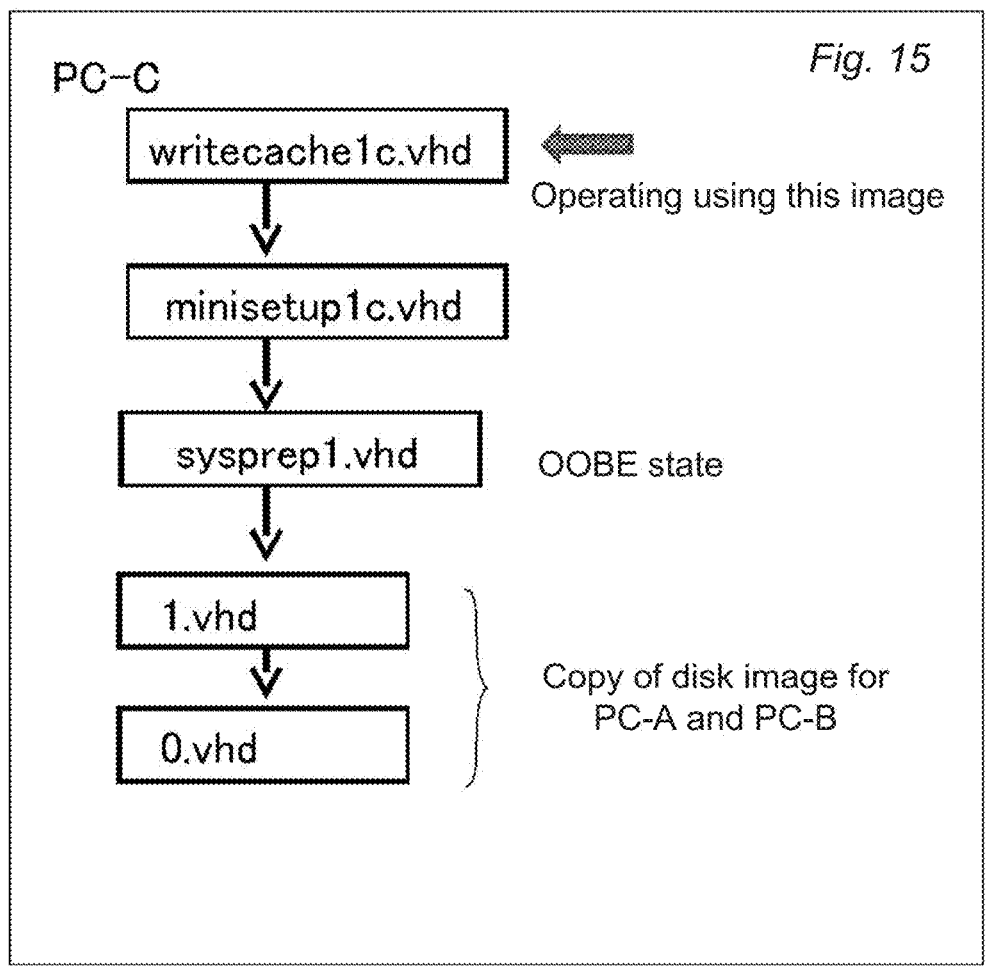

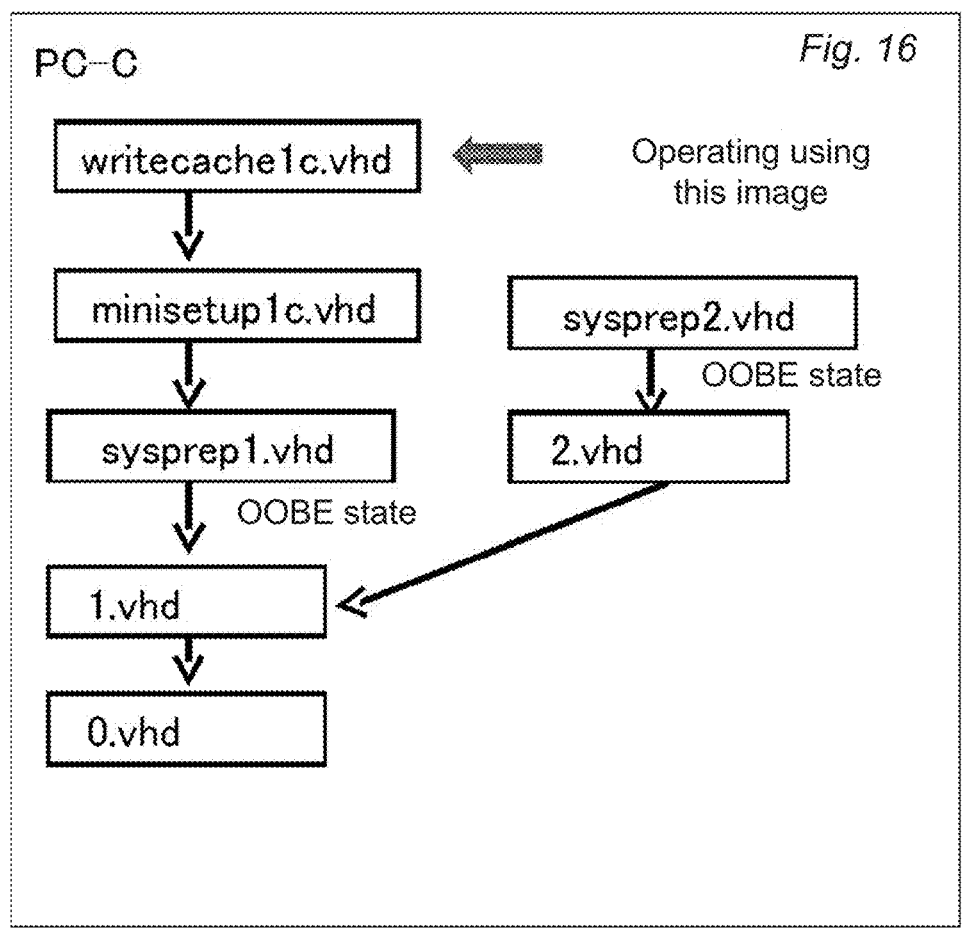

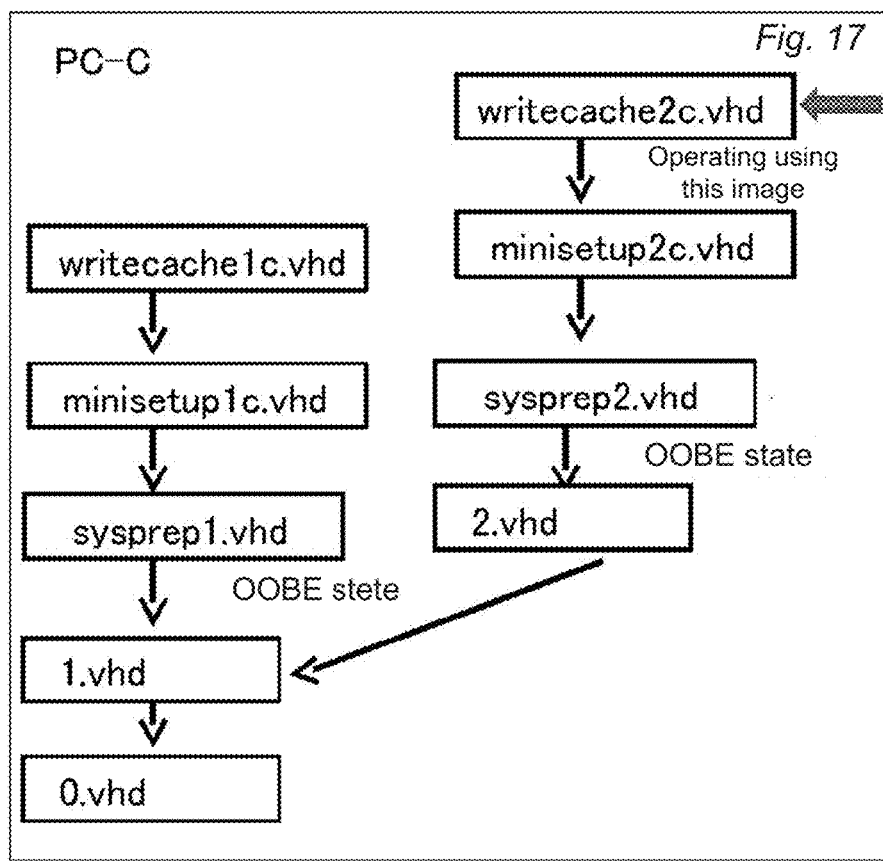

DISK DISTRIBUTION SYSTEM

TECHNICAL FIELD

This invention relates to a disk distribution system that enables an effective deployment of operating systems for a large number of client terminals.

BACKGROUND ART

In recent years, a method that uses a network boot system is widespread to deploy operating systems (hereinafter referred to as an "OS") for a large number of client terminals (hereinafter referred to as a "terminal"). (Patent Document 1) The network boot system is characterized that "OS image data", which is stored in network boot server as a disk image including the OS for the terminals, is mounted directly to each terminal through a high speed network, such as a Local Area Network (LAN) and is shared by the terminals. Then, its largest advantage is immediate reflection of updated content of the OS image data (more precisely, updating after each terminal is rebooted next time) when the OS image data is updated on the network boot server side. Furthermore, since the network boot server is required to manage only one OS image data for the terminal, generation-management of a plurality of versions is also relatively easily achieved.

The network boot system is supposed that one network boot server is connected to a large number of terminals ("1:N connection"). It is a prerequisite that each terminal is connected to a high speed network environment from the boot time. A large scale network boot system having more than 50 terminals, for example, is not expected to provide a comfortable operation environment for practical use, if the LAN environment is not connected by a "Gigabit" high speed network. A spread of the network boot system in recent years is due in large part to that of this very high speed network.

On the other hand, there is a known technique that a common OS image data is processed as master data and its copy is distributed and each terminal is booted by using the copy (hereinafter referred to as a "disk distribution technique" in this present invention). (Patent Document 2) Although the disk distribution technique has provided disk-like recording media, such as DVD and CD (from which the name of the disk distribution technique is derived), to deliver (distribute) a boot image of OS, a method for distributing data from server to client terminal through the network, etc. is also adopted in recent years. A boot method (like the disk distribution technique) that the terminals can be sufficiently booted in a local environment even if the terminals do not connect the network is called "local boot" against "network boot" herein.

CITATION LIST

Patent Literature

Patent Literature 1: International Publication No. 2009/069326
Patent Literature 2: U.S. Pat. No. 6,108,697

SUMMARY OF INVENTION

Technical Problem

Assuming that an OS image data is for a current desktop environment, the OS image data size is 50 GB to 100 GB or more. Thus, an extremely long time is required for distributing OS image data to a large number of client terminals by using the disk distribution technique.

For example, if OS image data is distributed using recording media, a large number of recording media are required to be prepared. If OS image data is distributed from one master server to a large number of terminals using a unicast distribution, the transfer rate per one terminal is reduced significantly due to restriction in the network bandwidth and it also requires an extremely long time for distribution.

Furthermore, the disk distribution technique has a disadvantage that the distribution to each terminal must also be restarted from the beginning when its master data is updated. Additionally, the current desktop environment requires highly frequent update, such as an update operation of OS and security software, even if an operation, such as installing new software, is not required at all. The disadvantage of time-consuming disk distribution has been fatal.

As mentioned above, while the network boot system can solve these problems, it has a disadvantage that:

(1) it cannot use network whose data transfer rate is slow; and (2) terminals cannot be booted, let alone continue any operation when the terminals cannot communicate with the network boot server.

While a cache mechanism at the terminal side in the network boot system may solve the above problem partially, a network connection is required when an OS image data on the server is updated.

Thus, the system basically requires that:

"the network boot server is connected to each terminal through network equipment by a cable network"; and "the network equipment at each terminal is at least in an online state (a state that the network equipment, such as a network card and a switching hub, is powered and that each terminal can communicate with the network boot server) and is connected to the server".

This invention has been made in view of the above-described circumstances. A main technical subject is to, assuming "local-boot" (each terminal can be booted even if it cannot communicate with the server), provide a new disk distribution system capable of efficiently executing update or generation management of OS image data, which is an advantage of the network boot.

Solution to Problem

A disk distribution system of the present invention includes at least one master server that is connected with a plurality of terminals through the network, wherein an OS image data, or the OS image data and one or more differential data relative to the OS image data are processed as the master data, the OS image data and the differential data being managed by the master server, a copy of the master data or the master data converted into a predetermined format is distributed as a boot image for the terminals, when the master data is updated, the terminals receive the differential data relative to the master data before updating through the network from the master server while the terminals are operating, and the boot images of the terminals are updated by rebooting the terminals.

Herein, "master server" refers to at least one computer that holds "master data" as the source of the copy. Additionally, "reboot" is required to reflect the update content of the boot image, whereas the terminals are rebooted due to a variety of purposes. Thus the timing when the boot image is updated after receiving the differential data from the master server depends on the setting condition of each terminal.

The OS disk image for distribution in the present invention is supposed not to be used by a virtual machine on each terminal, but to be used for local-boot through a normal boot process. "Local-boot" is assumed to include a situation that terminals hold cache data and can be booted without connecting to the network boot server (in an offline state) in the network boot system.

Each terminal can receive only differential data through the network while operating, when the master data is updated. Herein, "while operating" refers that OS is in a normal state after the terminal completes its boot process.

The terminals may be provided with a difference management mechanism that holds data (including its host name and its IP address) unique to each terminal, write data to each terminal and configuration information of the device driver, etc., as the differential data relative to the boot image. The difference management mechanism may also be a virtual disk system or a copy-on-write file system.

The differential data may be a differential data relative to the OS image data in Out-Of-Box Experience (OOBE). More specifically it may be configured to use the latest OS image data, which is corresponding to the state after the terminal completes loading of the device drivers, as differential data relative to the data in OOBE state, when the terminal is booted for the first time using the operating system for itself, or required device drivers are loaded to the kernel after the terminal is booted as necessary, In such a configuration, device drivers can be loaded to the kernel of the operation system for the terminal on first boot or after boot as necessary, even if each hardware configuration of the terminals is different respectively. This eliminates the need that device configuration at each terminal side should have an identical deployment and allows boot of each terminal because it absorbs the difference of device configurations.

In the network boot system that boots a large number of terminals using common OS image data, all the terminals are supposed to have the same hardware configurations in order to provide minimum parameters, such as IP address, host name and domain information and complete booting process in relatively short time, and thus the network boot system does not guarantee the proper operations if the hardware configurations are different. Whereas, a system of this invention can operate even if the hardware configurations are different.

The image data in OOBE state requires a setup procedure of device drivers on the first boot and has a disadvantage that it delays the boot time. Thus, if all the terminals have the same hardware configurations, it is more efficient to prepare one master data which comprises the OS image with preset device drivers etc., than to use the OS image data in OOBE state. For example, if a system configured with the network system is replaced by a system of this present invention without changing the hardware configurations, using the OS image data in OOBE state is not necessarily essential.

The "first boot" refers to "the first boot procedure of OS after the image data is updated", and setup procedure of the device drivers is not required at every boot other than the first boot.

Additionally, the terminal may have administrative OS to manage the boot image or the differential data. The administrative OS is another OS that is started independently from OS for boot, and any kind of the OS can be used if the OS can recognize and manage the boot image or the differential data in an OS level. For example, pre-installed OS in a terminal may be used. By booting with the administrative OS, the operations, such as initializing, copying, renaming and merging of the boot image or the differential data, can be made.

Additionally, one terminal may be configured to have one or more write caches. If the terminal is configured to write to the write cache, it can be restored to the condition before writing just by deleting the write cache.

The terminal may have a function to receive a copy of the master data and the differential data through the network from the master server, and to initialize a boot disk of the terminal. More specifically, the terminal may receive the copy of the master data from the master server while the terminal has been in operation for example using another network-connectable OS (called "initialization OS") in advance, and also be booted using the copy as the OS for boot. Herein, the initialization OS can be any kind of other OS which is independently booted from the OS of master.

For example, the OS pre-installed in the terminal or other OS, such as Linux (registered trademark), may be used.

Additionally, the copy of the master data is not necessarily distributed "through the network" immediately after initialization of the terminal, and a conventional distribution method using recording media etc. can also be used. The "initialization OS" and the "administrative OS" can be the same.

In this case, the data can be formed in a predetermined disk format that is format-converted based on the copy. In any case, terminals are local-booted in the sense that the terminals are booted using the OS image data received as an OS for boot, after receiving the copy of the master data. The terminals can be booted and continue working even if they cannot communicate with the network boot server. It is a big advantage over the network boot system.

One of the plurality of terminals may be configured to work as a master server. Thus, a master server need not be assigned to independent server.

The master server may be configured to distribute the differential data for converting into OS image data in OOBE state, to terminals having different hardware configurations.

The terminals may be configured to receive OS image data for the other terminals with different hardware configurations from the master server, then to receive the differential data for converting the received OS image data into that in OOBE state, and to be booted using the OS image data.

Advantageous Effects of Invention

Since the terminals can be booted even if they cannot communicate with the network boot server, any network access does not occur on boot and thus the terminals can continue working. Additionally, if a master data is updated, the terminals can receive the differential data through the network during operation of the terminal, and it allows the server to use a network whose data transfer rate is slow, for example wireless connection and to perform a multicast distribution or a peer-to-peer distribution, etc.

BRIEF DESCRIPTION OF DRAWINGS

FIGS. 5A and 5B are diagrams showing update and distribution procedures at terminal A in accordance with the forth embodiment.

FIG. 8 is a diagram showing creation procedures of differential data at terminal A before transferring its differential data in accordance with the fifth embodiment.

FIGS. 9A and 9B are diagrams showing a creation procedure of write cache at terminal A in accordance with the fifth embodiment.

FIGS. 10A and 10B are diagrams showing a state of a virtual disk at terminal B after transferring its differential data in accordance with the fifth embodiment.

FIGS. 11A and 11B are diagrams showing initialization procedures at terminal B after transferring its differential data in accordance with the fifth embodiment.

FIG. 12 is a diagram showing a creation procedure of write cache at terminal B after transferring its differential data in accordance with the fifth embodiment.

FIG. 13A is a diagram showing a state of a virtual disk at terminal A immediately after [2.vhd] is transferred to terminal B from terminal A and then the terminal B is booted, and FIG. 13B is a diagram showing a state of a virtual disk at terminal B at that time, in accordance with the sixth embodiment.

FIGS. 14A and 14B are diagrams showing processing procedures of a virtual disk at terminal A in accordance with the sixth embodiment.

FIG. 15 is a diagram showing a state of a virtual disk at terminal C in accordance with the sixth embodiment.

FIG. 16 is a diagram showing a state of a virtual disk at terminal C after transferring its differential data in accordance with the sixth embodiment.

FIG. 17 is a diagram showing an initialization procedure at terminal C after transferring its differential data in accordance with the sixth embodiment.

DESCRIPTION OF EMBODIMENTS

Hereinafter, a disk distribution system of the present embodiment is described in detail with reference to the drawings. First, an embodiment of the disk distribution system, which is premise of the present invention, is exemplarily described. Descriptions in each embodiment should be purposefully interpreted in order to understand a technical thought of the present invention, and should not be limited with the descriptions of these embodiments. Descriptions for each embodiment can be performed in combination respectively, except as otherwise expressly stated.

First Embodiment

—Configuration Example

Figure 1:
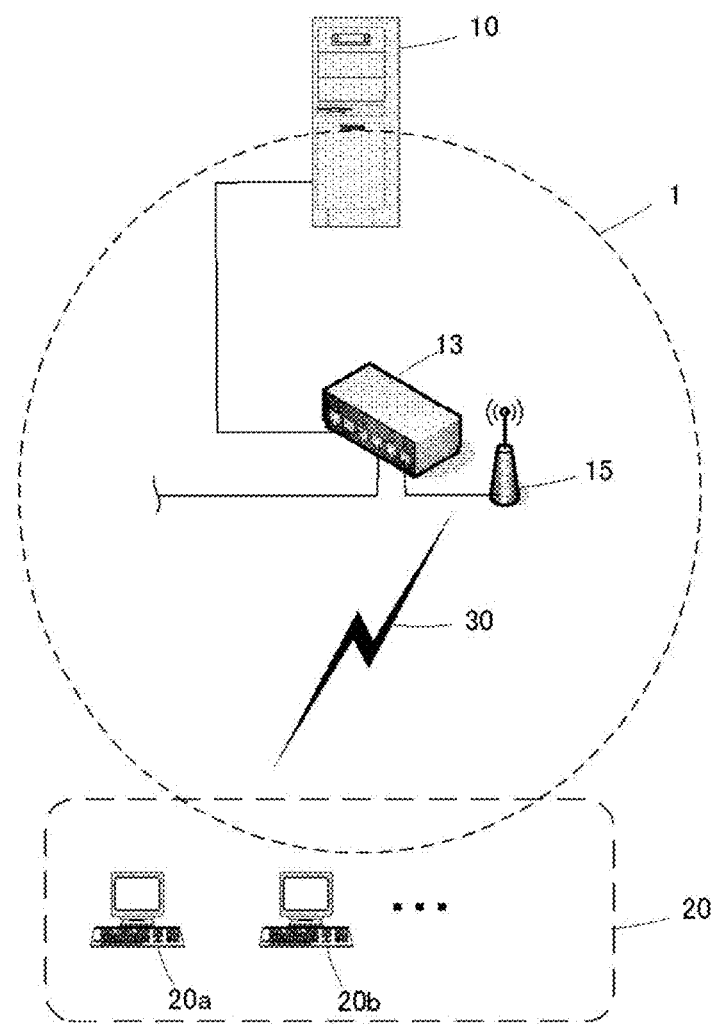
FIG. 1 is a conceptual diagram for illustrate a basic configuration of a disk distribution system in accordance with the first embodiment.

FIG. 1 is a configuration example of a disk distribution system of the first embodiment. In this embodiment, at least one master server 10 and a plurality of terminals 20 (20a, 20b, . . . ) are connected with a wireless LAN 30 via the wireless LAN access point 15 within the LAN 1 which is comprised with a network device, such as a switching hub 13.

Herein, the master server 10 may be configured to be one of the terminals (20a) which can serve as the master server. Additionally, the master server 10 may be a virtual machine. Although this configuration uses a wireless LAN, a configuration using a wired LAN is also available.

The "disk distribution system", which is premise of the present invention, is different from a network boot system, and each terminal 20 may be local-booted using its OS for boot. Thus, each terminal can be booted with a connection to a server through not only the wired LAN but also the wireless LAN as shown in FIG. 1, and it can also be booted even if it is not connected to the network.

First, an initialization OS is used for configuring an environment shown in FIG. 1. Any kind of the initialization OS can be used, which can be started independently from the OS of the master data. OS pre-installed in the terminal or other OS, such as Linux (registered trademark), may be used.

Each terminal is booted using the initialization OS. Since each terminal can communicate with the master server 10 through the network while the initialization OS is in operation, it receives a copy of a master data and its differential data, stores the copy in each terminal as the "OS for boot", and is booted using the stored copy.

If an OS image data distributed from master server 10 is, for example, a "virtual disk image", the data can be processed as a "file" for the initialization OS. This allows each terminal to receive the data by a simple operation "file-copy" from the master server 10 connected to each terminal through the network. Instead of the file-copy, the data may be a data in a predetermined disk format that is format-converted based on the copied data.

Data may be format-converted for various purposes, such as a compression, an encryption and format-conversions that operating OS at a terminal can recognize. Furthermore, the received data may be not only stored in a file format, but also expanded and written into the disk in a manner of V2P (conversion from a virtual machine to a physical machine).

However, since the size of the master data is corresponding to that of a system disk of OS for desktop, the size is supposed to be 50 GB to 100 GB or more, and it takes several tens of minutes to transfer using a unicast connection even in a gigabit network. It takes even longer hours as the number of terminals increases.

Thus, more efficient distribution means can be used, such as a multicast distribution, a broadcast distribution and a peer-to-peer distribution. Alternatively, the distribution means using recording medium, such as DVD, not through a network can be used. The data may be divided into a plurality of parts of the data and transferred, as necessary. Furthermore, check sum may be checked on transfer and in case the data transfer is found to be failed, the data is copied again so as to enhance reliability.

In any case, the terminals can be local-booted in the sense that the terminals are booted using the received OS image data as an OS for boot, after receiving the copy of the master data. Thus the disk distribution system is different from the network boot system, and the terminals can be booted and continue working even if they cannot communicate with the network boot server. It is also different from using virtual machines and thus no overhead in CPU processing or access to peripheral device is produced.

As mentioned above, the master data having a large data size is required to be copied sequentially in the boot disk of the terminal (a local disk of a terminal, or a disk etc. having the data required to start OS). However, if the master data is updated after it is distributed to each terminal 20, only the differential data relative to the master data before the updating is distributed from the master server 10 to each terminal 20. For this purpose, a "mechanism that manages OS image data by using the differential data" is supposed to be provided.

Although it depends on the Operating System to be distributed, a certain type of OS is provided with this function. A virtual disk may also be one of the examples. On the operating system of the terminal, the virtual disk is configured as one or more "files" formatted into a specific file format, and if the file is updated the "differential file" is created. By distributing this differential file to each terminal 20, it is not necessary to copy the master data (before the updating) having a large data size to each terminal 20 again. Each terminal 20 can be booted using the master data or the differential data. The boot process is a normal process in non-virtualized environment, which includes loading BIOS etc., not a process for a virtual machine.

Because of this requirement, in the present invention, after each terminal receives the copy of the master data, the received OS image data must be directly used to boot each terminal as a disk for boot, not used after read into the virtual machine.

While the specific and detailed utilization procedure of a "virtual disk technique" of the present invention is mentioned later, the utilization procedures for the OS image data in the virtual machine and for the present invention are mentioned herein.

If a virtual machine loads the OS image data and utilize it:

(1) an OS started by OS image data is used while another OS that is the base for starting an operation environment for the virtual machine is operating; and (2) when the OS started by the OS image data accesses the hardware of each terminal, overhead is produced because it is operated under the control of the virtual machine.

Whereas, if an OS image data is directly utilized to boot each terminal as a disk for boot as in the present embodiment:

(i) an OS started by the OS image data is started as only one OS that is working at that time; and (ii) an OS started by the OS image data does not produce any overhead because it can directly access the hardware of each terminal.

Thus, they are different essentially.

Second Embodiment

—Restoration of the Disk, and Management of Differential Data—

Details about practically managing differential data are described in the present embodiment.

Example 1

—Restoring Disk, No. 1—

Terminals are often required to be restored by reboot to an "initial states" that the administrator predetermined, at some places, such as facilities where a large number of terminals are provided to let unspecified users utilize the terminals for a short time. If the disk distribution system described in the first embodiment is assumed to be employed and to apply this difference management mechanism, it can satisfy the user needs.

As an example, Windows (registered trademark) can process file formats represented by the extensions ".vhd" or ".vhdx" called "VHD format". The VHD format file is associated with "a state at a given point in time in a storage device" containing an OS image data, etc. Furthermore, separately from a master data, a differential data relative to the master data can be created at an arbitrary timing. Additionally, an additional differential data relative to a specified differential data can be created, and also the plurality of differential data are merged (coupled) to create one file.

Figure 2A:
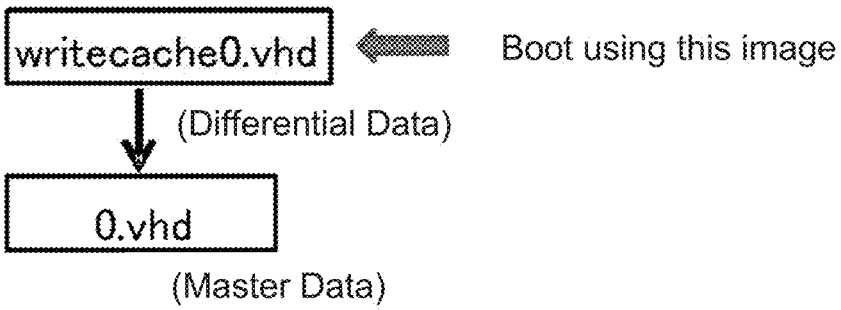
FIGS. 2A, 2B and 2C are conceptual diagrams showing behaviors in accordance with Example 1 to 3 of the second embodiment.

FIG. 2A is a conceptual diagram showing behaviors in accordance with Example 1. "0.vhd" shown in FIG. 2A is a file representing an OS master data in an initial state. The initial state may be a state immediately after OS is installed, or a state after an installation of required programs or driver software is completed. Namely any state can be an "initial state".

A differential data "writecache0.vhd" relative to the file "0.vhd" representing the initial state is created and each terminal is booted using the differential data "writecache0.vhd". FIG. 2A illustrates that data shown at a rear end of an arrow is the differential data relative to data shown at a front end of the arrow. In such a configuration, even after a terminal is booted, the device can be immediately restored to the initial state by "initializing" the differential data "writecache0.vhd" into zero in content.

This corresponds to let the differential data "writecache0.vhd" operate as a write cache. Even if the differential data is deleted and the terminal is booted using the master data, the terminal can also be restored equally to the initial state. However, in that case, since no write cache is created and additional data is stored directly in the master data, it is preferable to leave the differential data itself and to clear (initialize) only the content in order to let the write cache operate at next boot.

Here again, in the present embodiment, the OS included in the master data "0.vhd" or the differential data "writecache0.vhd" stored in VHD format is directly operated as a physical OS of each terminal, not operated on a "virtual machine" of each terminal. It is supposed to be difficult to clear the differential data "writecache0.vhd" itself while the terminal is booted using the differential data "writecache0.vhd". In such a case, an "administrative OS" is separately introduced as another OS which is to be started independently, and the differential data "writecache0.vhd" can be initialized after the terminal is booted temporarily using the administrative OS.

Example 2

—Restoring Disk, No. 2—

According to Example 1 mentioned above, since an administrative OS must to be started in order to initialize the differential data every time, a waiting time occurs to restore the disk. However, if two differential data ("writecache0-1.vhd" and "writecache0-2.vhd") are used, this problem is avoided.

Figure 2B:
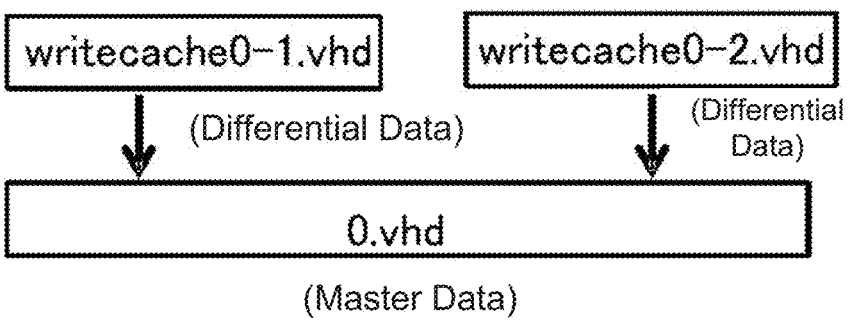

FIG. 2B is a conceptual diagram showing behaviors in accordance with Example 2. First, a second differential data "writecache0-2.vhd" is created when (or before) the terminal is booted using a first differential data "writecache0-1.vhd". Since the content of the second differential data is zero, the second differential data "writecache0-2.vhd" is equal to being in an initial state. On the next boot, it is booted using this second differential data "writecache0-2.vhd". While a client OS is operating using the second differential data "writecache0-2.vhd", the first differential data "writecache0-1.vhd" is initialized, and it is booted using the first differential data "writecache0-1.vhd" next time. This process may be automated using some programs. As a result, the two differential data ("writecache0-1.vhd" and "writecache0-2.vhd") relative to the master data "0.vhd" are created, and while one is used for booting the terminal, another is initialized. A repetition of this process enables a restoration to the initial state every time without using the administrative OS. Additionally, it may be configured to create additional differential data, such as "writecache0-3.vhd" and "writecache0-4.vhd", one after another, not to use "writecache0-1.vhd" and "writecache0-2.vhd" repeatedly and alternately.

Second, as an application of Example 2, an operation that user data etc. is not deleted is described. The disk restoring function described in Example 1 is performed by initializing the differential image (write cache) on boot of the terminal. As a result, all files etc. stored only in the write cache have also been lost.

However, if two write caches (differential data) are used, the change information before reboot (user data, such as document data) remains in one differential data "writecache0-1.vhd" used before reboot. Thus, if the change information is copied into the same storage area while the terminal is being operated using another differential data "writecache0-2.vhd", the operation that the user data can remain even after the terminal is rebooted can be employed. If the operation of such a configuration is employed, no user data is deleted, while changes to the system are restored on every reboot.

As described above, if a plurality of write caches are provided, the operation, in which no administrative OS is required or required data can be transferred and stored, may be employed.

Different from the above, a configuration that write caches are not initialized on normal reboot of the terminal may be employed, to hold files or system changes made by users as much as possible. This configuration may be achieved by limitedly executing an initialization process of write cache only when the master data is updated. An initialization of the write cache is required if the master data is updated. However, as with the above case, it also permits the configuration that user data is continuously maintained while "system updating" is executed, by referring to "write cache information before the updating of the master data" and copying the change information to the same section of "write cache after the updating of the master data". It may be also configured, more simply, to maintain the "user data in a separate area of the storage device (other drive)".

Example 3

—Example of Creating a Plurality of Point for Restoration—

Figure 2C:
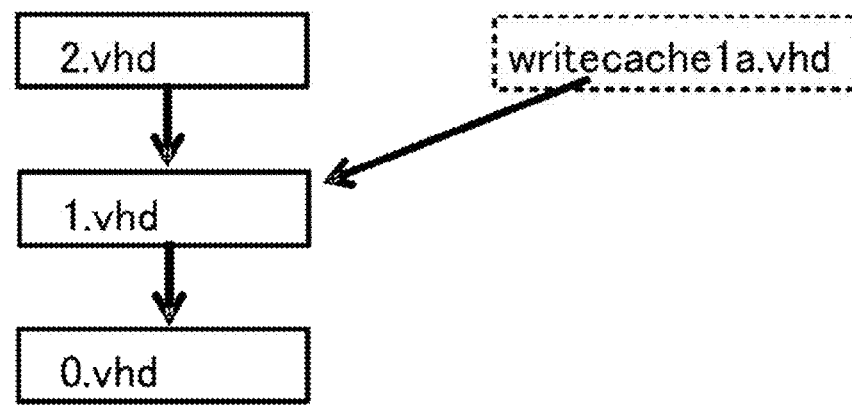

FIG. 2C is a conceptual diagram showing behaviors in accordance with Example 3.

The differential data can comprise a plurality of hierarchies. For example, as shown in FIG. 2C, if a differential data "1.vhd" relative to a master data "0.vhd" of the initial state is created, this differential data is derived from the master data "0.vhd". If a differential data "2.vhd" relative to the differential data "1.vhd" is created in this state, this differential data "2.vhd" is derived from not only the differential data "1.vhd" from which it derives but also the master data "0.vhd".

Here, if a terminal is booted using the differential data "1.vhd", then the differential data "1.vhd" will be updated. If the differential data "1.vhd" is updated, the differential data "2.vhd" cannot depend on the differential data "1.vhd", and the terminal cannot be booted using the differential data "2.vhd" afterward.

Thus, when "1.vhd" is used for boot, a differential data "writecache1a.vhd" is created as a clone of "1.vhd". If the terminal is booted using the differential data "writecache1a.vhd", "1.vhd" is not modified. As a result, the terminal is booted using a content equal to that of the differential data "1.vhd" and it may keep the dependent relationship between "2.vhd" and "1.vhd".

Third Embodiment

—Example of Initial Image Setting Procedures for a Plurality of Terminals—

Even if one master data is copied to boot disks of a plurality of terminals and the terminals are "local-booted" using them, "individual setting" for each terminal is required to be executed. If the network boot system is employed, it often takes a "dynamic setting of host name, etc." because it needs to boot the terminals quickly. Although the dynamic setting of host name etc. has an advantage that the setting is completed on boot and reboot is not required, all the terminals are supposed to have the same hardware configurations and it has a disadvantage that the setting prevents an absorption of a difference of device configurations. If the hardware configuration at each terminal side does not have an identical configuration, each device driver that should be loaded into each kernel is different at each terminal.

In the following, a procedure for integrating content of boot disks of a plurality of terminals that are newly introduced is described. Since a hardware configuration at each terminal may be different respectively, an OS image data called "Out Of Box Experience (OOBE)" is used as an OS image data for distribution. The OOBE state is "a state of not depending on terminals", and in other words, it is supposed to be "a state of including all prospected device drivers". If an OS image data in OOBE state is deployed as a master data and each boot disk for each terminal is equipped with the copy, each terminal loads disk driver that each terminal requires respectively on first boot, and stores its unique setting in a storage device of each terminal, and the difference of the hardware configuration can be absorbed.

First, an initialization OS is started in any way, such as using removable recording media (DVD or USB storage device, etc.) and using a network boot. Second, a master data "0.vhd" that is an OS image data in OOBE state is copied to a boot disk of a terminal and an administrative OS is also introduced.

Third, individual setting for each terminal is executed. A tool for re-detecting hardware is prepared as an individual setting way. For example, in the case of Windows (registered trademark), "mini-Setup" process can be used. The "mini-Setup" process is to register network connection information (an IP address, a host name and yes or no for a domain participation, etc.) with the terminal and to start detecting hardware in order to load a device driver which is connected to the terminal but not yet loaded in a kernel of the OS. An execution of this process absorbs a difference of hardware to a certain extent and enables a resetting suitable for each hardware configuration of each terminal (an individual setting for each terminal).

Figure 3A:
FIGS. 3A and 3B are conceptual diagrams showing procedures for an individual setting for terminals, described in the third embodiment.
Figure 3B:

FIGS. 3A and 3B are conceptual diagrams showing procedures for individual settings for terminals, described in the third embodiment. First, as shown in FIG. 3A, a copy of a master data "0.vhd" in OOBE state is deployed in a boot disk of a terminal. Second, a first write cache is prepared not to update a master data. Specifically, a differential data "minisetup0a.vhd" relative to "0.vhd" is created. After the terminal is booted using this differential data, mini-Setup is immediately executed (Step S1).

The terminal is shut down once after mini-Setup is finished, and a second write cache is prepared as shown in FIG. 3B. Specifically, a differential data "writecache0a.vhd" relative to the above mentioned "minisetup0a.vhd" is created, and the terminal is booted using the image (Step S2). Some programs may enable a procedure Step S1 to Step S2 to be auto-executed.

By such procedures, the terminal can be booted in a state after mini-setup is completed from the next time.

After that, the initialization of the differential data "writecache0a.vhd" (second write cache) allows this terminal to be booted every time in a state immediately after mini-Setup is completed.

Furthermore, it is known that the execution of the mini-Setup often fails, if a conventional type of disk distribution mechanism is employed. The reason is as follows: when the mini-Setup is executed, terminals often communicate with the server for a domain participation or a mounting of a file server etc.; and in this case, some malfunctions often occur, for example "the terminal is not linked to a network", "simultaneous initializations of a plurality of terminals causes the server to be overloaded and timed out", etc.

It is known empirically that at least two or three terminals fail in mini-Set procedure if 100 terminals are initialized simultaneously.

In this procedure, however, even if mini-Setup fails to be executed, mini-Setup can be successfully executed by just re-creating "minisetup0a.vhd" without coping "0.vhd" etc. again and by re-executing the mini-Setup with the master data "0.vhd" in OOBE state.

By the series of above mentioned principles, one image can be distributed to a large number of terminals and a unified image can be distributed even if the hardware configurations are different.

However this procedure requires transferring "0.vhd" that is considered to be large-sized to a large number of terminals.

Forth Embodiment

—Update and Distribution of a Master Data—

For simplicity, a procedure for updating a master data and distributing the master data to other terminals is described, on the assumption that the present example includes two terminals (terminal A and terminal B), and one of them (terminal A) operates as a master server.

Update of a Master Data

Figure 4A:
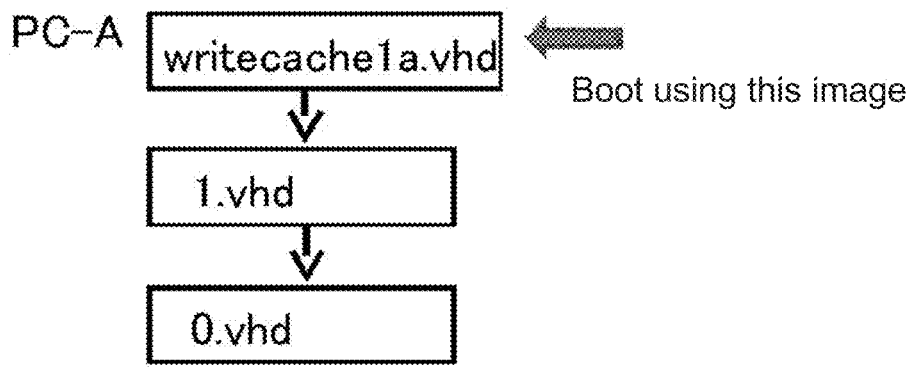
FIGS. 4A and 4B are diagrams showing virtual disk configurations of terminal A and terminal B in accordance with the forth embodiment.
Figure 4B:
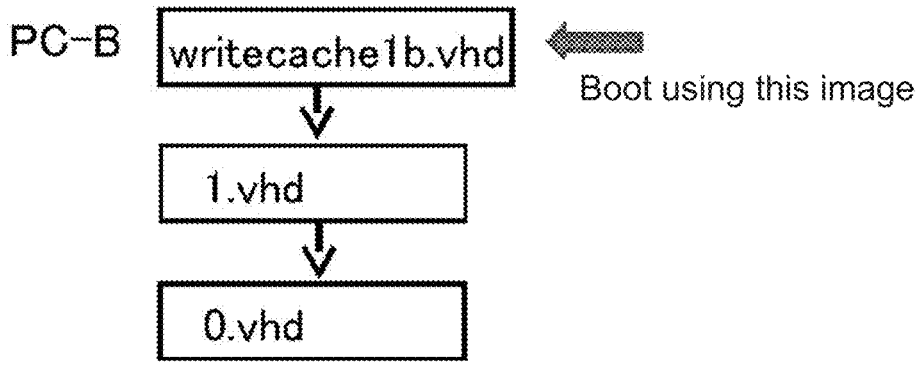

Both of FIGS. 4A and 4B show virtual disk configurations of a terminal A and a terminal B respectively.

When the terminal A includes a master data "0.vhd" (OS image data) and a first differential data "1.vhd" relative to the master data, a differential data "writecache1a.vhd" relative to the first differential data "1.vhd" is created as a write cache, booting the terminal A using this.

When an installation of an application, etc. is executed in the terminal A, the changes to the OS image data by the operation is stored in the differential data "writecache1a.vhd" (write cache). When the terminal A is shut down after that, the content of "writecache1a.vhd" in that state is an "update data" that should be distributed to other terminals. The "writecache1a.vhd" is renamed to "2.vhd" at this timing, in some way, such as by booting the terminal using an administrative OS. Additionally, a differential data "writecache2a.vhd" relative to "2.vhd" renamed earlier is created, for a next boot of the terminal A.

FIG. 5A represents an operating state of an administrative OS using a master data "manage.vhd" prepared as a separate virtual disk in the terminal A, and shows that an update data for the master data in the terminal A is renamed and additionally "writecache2a.vhd" (write cache) is created.

Distribution of an OS Image Data

The terminal A is rebooted using the write cache "writecache2a.vhd", while being operated using the administrative OS in FIG. 5A. FIG. 5B represents an operating state of the terminal A using the write cache "writecache2a.vhd". Then the "2.vhd" in the terminal A is copied to a terminal B in this state. If the "1.vhd" in the terminal A is assumed to be also the same as that in the terminal B, the "2.vhd" copied to the terminal B is also to be the differential data relative to the "1.vhd" in the terminal B. This copy procedure may be executed while the terminal B is operating using "writecache1b.vhd". (see FIG. 4B) It enhances the degree of freedom of the choice, such as devices, media and protocols used for the copy transfer, and enables to use a highly efficient distribution means etc. already described. Some sort of server or other terminal can be configured to relay the data, instead of directly transferring the data from the terminal A to the terminal B.

Figure 6A:
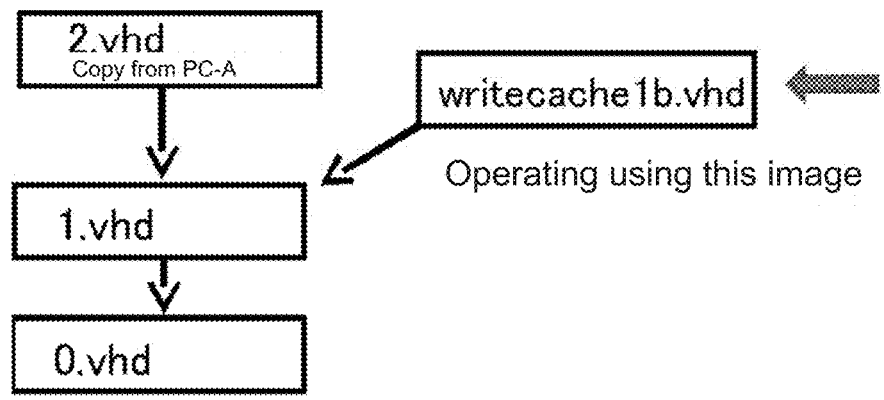
FIGS. 6A and 6B are diagrams showing states of a virtual disk at terminal B in accordance with the forth embodiment.
Figure 6B:
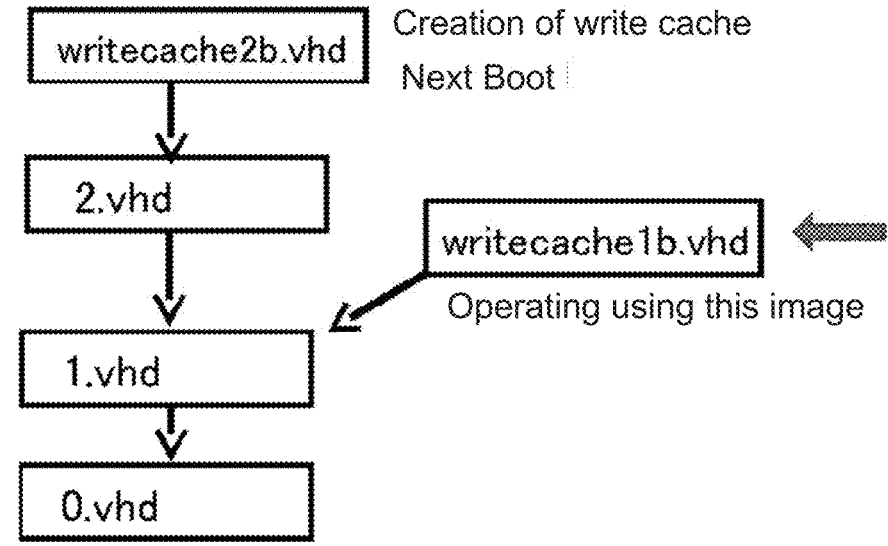

FIG. 6A shows that a copy procedure of "2.vhd" to the terminal B is completed. At this stage, the terminal B is operating using "writecache1b.vhd". If the differential data "2.vhd" of an updated master data is configured to boot the terminal B next time in this state, the update is reflected and then the update will be written in "2.vhd". Thus, as shown in FIG. 6B, a differential data "writecache2b.vhd" relative to the "2.vhd" is created without booting the terminal B using the "2.vhd". This differential data "writecache2b.vhd" also functions as a write cache.

After that, required setting information, such as an "IP address and a host name", is changed. If the content of "writecache2b.vhd" cannot be rewritten while the "writecache1b.vhd" is operating because of possible inconvenience of implementation, it may be configured to be rewritten using an administrative OS after reboot of the terminal. If information, such as a host name and an IP address, is configured to be dynamically set during the boot of the terminal, it can also skip the procedure for rewriting the "writecache2b.vhd". Then, if the terminal B is set to be booted using the "writecache2b.vhd" and is actually rebooted, the terminal B is booted in the state equivalent to the differential data "2.vhd". The file "writecache1b.vhd" may be deleted after reboot.

Deployment to a Large Number of Terminals

A repetition of similar procedures can be applied to a large number of terminals. A timing at which a copy procedure is executed or a new version is permitted to be used in other terminals can be freely controlled.

Fifth Embodiment

—Operation Example—

Creation Procedure of Differential Data for Distribution

The procedures for distributing an OS image data (a master data) to each terminal were described in the third embodiment with reference to FIG. 3. Since the state of each terminal differs after the execution of mini-Setup, the changes occurred in the master data after the execution cannot be distributed as a differential data. On the other hand, in the fourth embodiment, the procedures for copying changes, which occur in the terminal A functioning as the master server, to other terminals were described with reference to FIGS. 4 to 6. Since the procedures just enable the individual setting for each terminal, such as setting an IP address and a host name, they cannot be used if the hardware configurations are different as the third embodiment.

Thus, in this embodiment, procedures to distribute the changes which occur in the terminal A functioning as the master server, as a differential data to a plurality of terminals with different hardware configurations, are described.

Figure 7A:
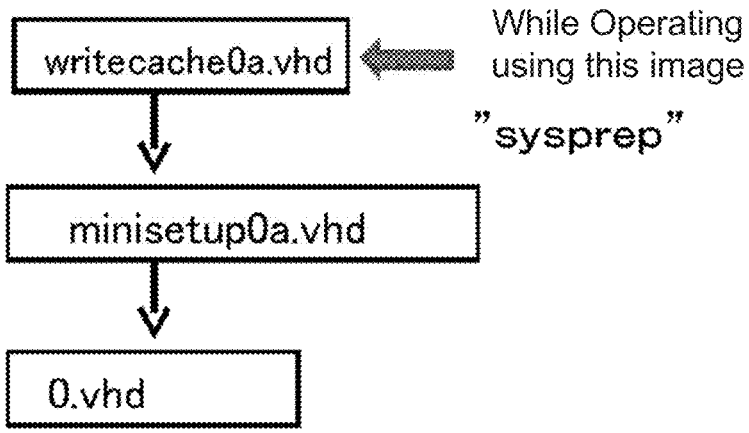
FIGS. 7A and 7B are diagrams showing processing procedures of a virtual disk at terminal A before transferring its differential data in accordance with the fifth embodiment.
Figure 7B:
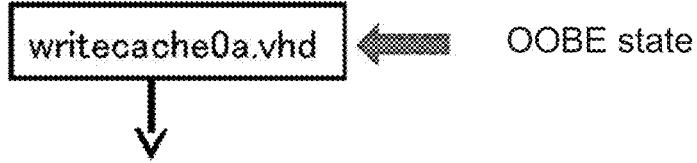

As shown in FIG. 7A, it is assumed that "minisetup0a.vhd" is the image which is mini-Setupped to be suited for the hardware configuration of the terminal A based on the OS image data "0.vhd" in OOBE state and the terminal A is operating by the differential data "writecache0a.vhd" (write cache) relative to the "minisetup0a.vhd".

In the above mentioned state, if some processes, such as installing an application, are performed, the changes to the image caused by the operation are stored in a "writecache0a.vhd" functioning as a write cache.

In this state, the OS image data is restored to be in OOBE state. It is equivalent to "sysprep" procedure for Windows (registered trademark). An execution of sysprep brings the currently operating OS image data "writecache0a.vhd" to be in OOBE state. Here, the terminal is rebooted after it is set to be booted using an "administrative OS" at next boot.

As shown in FIG. 8, the content of "writecache0a.vhd" and "minisetup0a.vhd" is merged after boot using the administrative OS, and a file whose name is "1.vhd" is created. The "1.vhd" created in this way is "in OOBE" and a "differential data relative to 0.vhd".

Then, as shown in FIG. 9A, "minisetup1a.vhd" is created as a differential data relative to this "1.vhd", the terminal A is rebooted after it is set to be booted using the "minisetup1a.vhd" at next boot. At this point, "minisetup1a.vhd" is a write cache relative to "1.vhd".

In this state, mini-Setup is executed, immediately after the terminal A is booted using the "minisetup1a.vhd" (write cache). When the mini-Setup is completed, the terminal A is rebooted after it is set to be booted using the administrative OS again at next boot.

FIG. 9A shows a relation between a master data and its differential data in a current terminal A. Since a differential data "1.vhd" is a disk image in OOBE state, it may operate on various hardwares.

FIG. 9B shows that an additional "witecache1a.vhd" is created as a differential data relative to "minisetup1a.vhd", from a state shown in FIG. 9A. The terminal is rebooted after it is set to be booted using this disk at next boot.

Such a setting enables the terminal A to be booted in a state corresponding to the new version "1.vhd".

An initialization of a write cache "writecache1a.vhd" also provides a disk restoration function, by which the disk is restored to a state after the disk is mini-Setupped.

By the above procedure, a differential data can be obtained that can absorb differences of device configurations and be distributed to the terminals with different hardware configurations.

Copying Data to Other Terminals

Then, a procedure until a terminal B uses a differential data "1.vhd" created in a terminal A is described. In the following example, the differential data "1.vhd" of the master data after update is mini-Setupped to be suitable for the terminal A and the terminal A is operating in the state, and an OS image data before update (a copy of the master data) "0.vhd" is mini-Setupped to be suitable for the terminal B and the terminal B is operating in the state.

First, the differential data "1.vhd" in the terminal A is copied to the terminal B. The copy procedure may be executed while the terminal B is operating using "writecache0b.vhd". It enhances the degree of freedom of the choice, such as devices, media and protocols used for the transfer, and enables a use of a wide variety of highly efficient distribution means etc. already described. Since the "1.vhd" is also a differential data relative to the master data "0.vhd", it is smaller in size than the master data "0.vhd". Thus, it has an advantage that the transfer time is significantly shorten, compared with copying the whole disk image.

Some sort of server can be configured to relay the data instead of directly transferring the data from the terminal A to the terminal B.

Furthermore, since the content of the master data "0.vhd" in the terminal A and the "0.vhd" copied to the terminal B is the same, a differential data "1.vhd" transferred to the terminal B may also be a differential data from the "0.vhd" in the terminal B. Thus, a virtual disk in the terminal B enters a state shown in FIG. 10A after the transfer of "1.vhd" to the terminal B is completed.

Second, a procedure until the terminal B uses a differential data "1.vhd" after the transfer is completed is described. The terminal B autonomously starts an initialization of the differential data "1.vhd", or it starts the initialization on reception of instructions from a server or a user of the terminal B. First, the terminal A is rebooted after it is set to be booted using an administrative OS at next boot. FIG. 10B shows that the terminal B is rebooted using the administrative OS.

After the terminal B is rebooted using the administrative OS, a "minisetup1b.vhd" is created as a differential data relative to the differential data "1.vhd". (FIG. 11A) Since "minisetup1b.vhd" does not hold the differential data from the "1.vhd" at that time, the content of "minisetup1b.vhd" is supposed to be equal to that of "1.vhd". This "1.vhd" includes a file indicating a setting content for mini-Setup (unattended. xml). Various information, such as an "IP address", a "host name" and "yes or no for a domain participation", can be set, by setting this file in a timely and appropriate manner. A proper unattended.xml file may also be obtained by communicating with a server. A rewrite of a content of the disk image, such as the file and the registry, without using unattended.xml also enables the individual setting for each terminal.

After that, when the terminal B is rebooted after it is set to be booted using the "minisetup1b.vhd" at next boot, mini-Setup is executed. (FIG. 11B) The terminal B that is booted using the "minisetup1b.vhd" executes a predetermined setup procedure (mini-Setup). The individual setting for each terminal may be executed at this stage. After that, a differential data "writecache1b.vhd" (write cache) relative to the "minisetup1b.vhd" is created, and the terminal B is rebooted after it is set to be booted using the image at next boot. (FIG. 12)

The terminal B can also be booted by using this procedure, while the customization procedure (mini-Setup) is executed based on a copy "1.vhd" of the differential data created in the terminal A. Furthermore, since a content of the write cache "writecache0b.vhd" can be referred even at this stage, a user data, etc. included in a virtual disk (before update) "writecache0b.vhd" may be configured to be copied to the virtual disk (after update) "writecache1b.vhd".

The "minisetup0b" and "writecache0b.vhd" may be deleted, since they are not required after these procedures are completed.

A series of procedures described above are also repeatedly applicable if additional new images, such as "2.vhd" and "3.vhd", are created. Only the differential data relative to each version of the image is transferred among the terminals, and it reduces the transfer size.

A repetition of similar procedures can be applied to a large number of terminals. A timing at which a copy procedure is executed or a new version is permitted to be used in other terminals can be freely controlled.

Sixth Embodiment

—Operation in an Environment with Mixed Hardware Configurations—

In the present embodiment, an operation in an environment that terminals whose hardware configurations are different and terminals whose hardware configurations are the same are coexisting is described. Although a preparation of two disk images suitable for each environment attains the operation in such a case, it requires two master disks and they must be managed respectively.

In the present embodiment, procedures for an operation by just one master data, even if "terminals whose hardware configurations are different" and "terminals whose hardware configurations are the same" are coexisting, are described.

First, it is assumed that a terminal A is a master server and the master data is updated repeatedly at terminal A. Additionally, it is assumed that a hardware configuration of a terminal B is the same as that of the terminal A, and a hardware configuration of a terminal C is different from that of the terminal A.

FIGS. 4A and 4B show virtual disk configurations of a terminal A and a terminal B respectively. "0.vhd" of the terminals A and B and "1.vhd" of the terminals A and B are the same respectively. Now, each terminal is booted using "writecache1a.vhd" relative to the "1.vhd" and "writecache1b.vhd" relative to the "1.vhd" respectively to operate as write caches.

Procedures for creating an additional "2.vhd", or distributing data from the master server (terminal A) to the terminal B were described with reference to FIGS. 5A, 5B, 6A and 6B in the fourth embodiment.

FIGS. 13A and 13B show states of virtual disks of the terminals A and B respectively right after "2.vhd" is transferred from the terminal A to the terminal B and the terminal B is booted. Both of the terminals are operating using differential data "writecache2a.vhd" and "writecache2b.vhd", both of which are write caches.

Furthermore, a differential disk "sysprep2.vhd" depending on "2.vhd" is created in the terminal A, and the terminal A is booted using the disk. (FIG. 14A) After that, the terminal A is shut down after executing sysprep procedure. Then, the terminal A is rebooted after it is set to be booted using the "writecache2a.vhd" at next boot. FIG. 14B shows a state of the virtual disk of the terminal A after this reboot. Additionally, these procedures can be performed as a series of processes when "2.vhd" is created in the terminal A.

FIG. 15A shows a virtual disk configuration of a terminal C. The terminal C includes OS image data "0.vhd" or "1.vhd" adapted to hardware for the terminal A or the terminal B. The terminal C cannot be booted using "0.Vhd+1.vhd" (master data). Thus the customization procedure is executed by mini-Setup procedure after sysprep procedure, and the terminal C is operating using a write cache "writecache1c.vhd" of an OS image data "minisetup1c.vhd" that has completed its customization procedure.

"2.vhd" and "sysprep2.vhd" are distributed from the terminal A to the terminal C in the state above. Here, since "2.vhd" is a differential data relative to the "1.vhd", the terminal C has a virtual disk configuration as shown in FIG. 16.

The terminal C is supposed to receive a differential data relative to "1.vhd" from the master server (terminal A), in a state that the terminal C is holding "0.vhd" (OS image series for the terminals A and B whose hardware configurations are different) and "1.vhd" (its differential data).

After that, if "minisetup2c.vhd" is created as a differential data relative to "sysprep2.vhd", the terminal C is set to be booted using the disk and it is processed according to the procedure described in the fifth embodiment, the terminal C turns in a state shown in FIG. 17 and it allows the terminal C to be booted using a disk equivalent to "2.vhd".

Based on a series of "0.vhd", "1.vhd", "2.vhd", . . . configured without using sysprep, a repetition of the procedures allows other terminals that require sysprep because of the difference of the hardware configurations to use the same disk.

Other Embodiment

The embodiment above has been explained by using VHD file format for virtual machines used in Windows (registered trademark) as a difference management mechanism. However, any file formats are available if the system can provide the difference management mechanism. For example, a file system in a copy-on-write form, such as ZFS file system, may be mounted as a boot disk for a terminal, or a snapshot function of other virtual machine program may be used.

REFERENCE SIGNS LIST 10 master server
13 switching hub
15 access point
20 a plurality of terminals (20a, 20b, . . . )
30 wireless LAN

The invention claimed is:
1. A disk distribution system comprising at least one master server that is connected with a plurality of terminals through a network,
the disk distribution system including
an OS image data as master data, the master data being managed by the master server, and
a copy of the master data as a boot image for the terminals,
the terminals receiving differential data reflecting an update to the master data through the network from the master server while the terminals are operating, and each boot image of each terminal being updated based on the received differential data by rebooting each terminal,
each terminal provided with a difference management mechanism that stores, as data relative to the boot image, at least any of
unique data including a host name and an IP address of the terminal,
write data to the terminal, and
configuration information of a device driver, wherein the OS image data is in Out-Of-Box Experience (OOBE) state as a boot image for the terminals, and the differential data includes setup data relative to the boot image, the setup data providing a customization from the OOBE state for the terminal and restoration data for, after the customization provided by the setup data, restoring the boot image for the terminal into OS image data in the OOBE state again, and wherein each terminal stores a separate copy of the master data as a boot image for the terminal, the differential data reflecting an update to the master data, and the data relative to the boot image, even after the boot image is updated by rebooting the terminal.

2. The disk distribution system according to claim 1, wherein when at least one occurs of a) a terminal is booted using an operating system for terminals for the first time, and b) required device drivers are loaded in a kernel of the operating system for the terminal as necessary after the terminal is booted, the terminal stores the latest OS image data, which corresponds to the OS image data after loading the device drivers, as differential data relative to the OS image data in the OOBE state.

3. The disk distribution system according to claim 1, wherein a terminal is provided with one or more write caches.

4. The disk distribution system according to claim 1, wherein a terminal is provided with an administrative OS to process the boot image or the differential data.

5. The disk distribution system according to claim 1, wherein the terminal is provided with a function to receive a copy of the master data and the differential data reflecting an update to the master data through the network from the master server, and to initialize a boot disk of the terminal.

6. The disk distribution system according to claim 1, wherein one of the terminals also functions as the master server.

7. The disk distribution system according to claim 1, wherein the master server distributes the differential data, including restoration data for converting the OS image into the OS image in the OOBE state, to at least two terminals whose hardware configurations are respectively different.

8. The disk distribution system according to claim 7, wherein a terminal receives from the master server the OS image data for one or more other terminals whose hardware configurations are different from the hardware configuration of the terminal, and the differential data for converting the received OS image data into the OS image data in the OOBE state, and the terminal is booted using the received OS image data and differential data.

9. The disk distribution system according to claim 2, wherein the terminal is provided with one or more write caches.

10. The disk distribution system according to claim 2, wherein the terminal is provided with an administrative OS to process the boot image or the differential data.

11. The disk distribution system according to claim 2, wherein the terminal is provided with a function to receive a copy of the master data and the differential data reflecting an update to the master data through the network from the master server, and to initialize a boot disk of the terminal.

12. The disk distribution system according to claim 2, wherein one of the terminals also functions as the master server.

13. The disk distribution system according to claim 2, wherein the master server distributes the differential data including restoration data for converting the OS image into the OS image in the OOBE state, to at least two terminals whose hardware configurations are respectively different.

14. The disk distribution system according to claim 13, wherein a terminal receives from the master server the OS image data for one or more other terminals whose hardware configurations are different from the hardware configuration of the terminal, and the differential data for converting the received OS image data into the OS image data in the OOBE state, and the terminal is booted using the received OS image data and differential data.

15. The disk distribution system according to claim 1, wherein the OS image data as master data includes one or more differential data relative to the OS image data.

16. The disk distribution system according to claim 1, wherein the copy of the master data as a boot image for the terminals includes data formed by converting the master data into a predetermined disk format.

17. The disk distribution system according to claim 1, wherein, after the OOBE state OS image data as a boot image of a terminal is updated based on the received differential data, and after the setup data relative to the boot image provides a customization from the OOBE state for the terminal, the restoration data can restore the boot image for the terminal into the OOBE state updated OS image data.

* * * * *